United States Patent [19]

Pope

[11] Patent Number: 5,611,261
[45] Date of Patent: Mar. 18, 1997

[54] GROUNDS DISPOSAL DEVICE

[75] Inventor: Randy D. Pope, Edinburg, Ill.

[73] Assignee: Bunn-O-Matic Corporation, Springfield, Ill.

[21] Appl. No.: 513,221

[22] Filed: Aug. 10, 1995

[51] Int. Cl.$^6$ ............................. A47J 31/06; A47J 31/00
[52] U.S. Cl. ........................... 99/289 R; 99/290; 210/771
[58] Field of Search ............................. 99/179, 290, 295, 99/289 R, 299, 300, 304; 210/770, 771, 452, 409; 426/433

[56] References Cited

U.S. PATENT DOCUMENTS

| | | | |
|---|---|---|---|
| 3,282,434 | 11/1966 | Pall | 210/453 |
| 4,894,156 | 1/1990 | Murken | 210/452 |
| 5,134,925 | 8/1992 | Bunn et al. . | |
| 5,245,915 | 9/1993 | Ford . | |
| 5,305,685 | 4/1994 | Midden . | |
| 5,372,728 | 12/1994 | Midden . | |
| 5,372,832 | 12/1994 | Bunn et al. . | |
| 5,395,515 | 3/1995 | Ford . | |

FOREIGN PATENT DOCUMENTS 2881 of 1887 United Kingdom .

Primary Examiner—Robert W. Jenkins
Attorney, Agent, or Firm—Trexler, Bushnell, Giangiorgi & Blackstone, Ltd.

[57] ABSTRACT

A spent beverage brewing substance disposal device for use with a beverage brewing apparatus. The disposal device is connected to the beverage brewing apparatus for receiving a slurry of spent beverage brewing substance and liquid. The disposal device includes a housing having a delivery port communicating with a drain conduit of the beverage brewing apparatus for receiving the slurry therethrough. A foraminous structure is retained in the housing and positioned for receiving the slurry. The foraminous structure allows a liquid portion to drain therethrough while retaining the solid or particulate matter of the slurry. A pressurizing apparatus is coupled to the housing of the disposal device so as to pressurize the interior chamber defined by the housing to expedite the separation of the liquid portion from the solid portion. Liquid which is drained from the slurry passes through the foraminous structure and into a drain. The housing is removable from the drain so as to facilitate easy emptying of the drained portion of the spent beverage brewing substance. Seals are provided between a cover of the housing and the housing and drain so as to seal the housing against increased internal pressure induced by the pressuring apparatus. A pump is also provided to drain the liquid portion from the device.

14 Claims, 2 Drawing Sheets

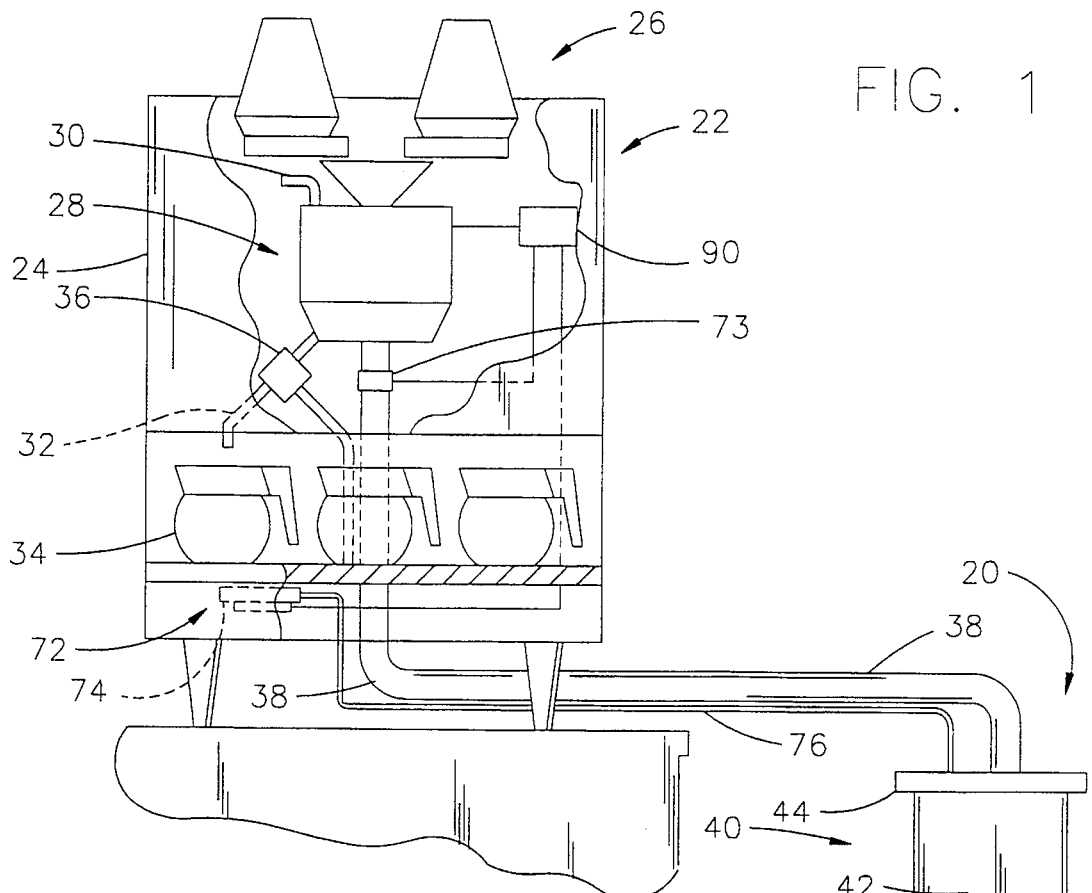
FIG. 1
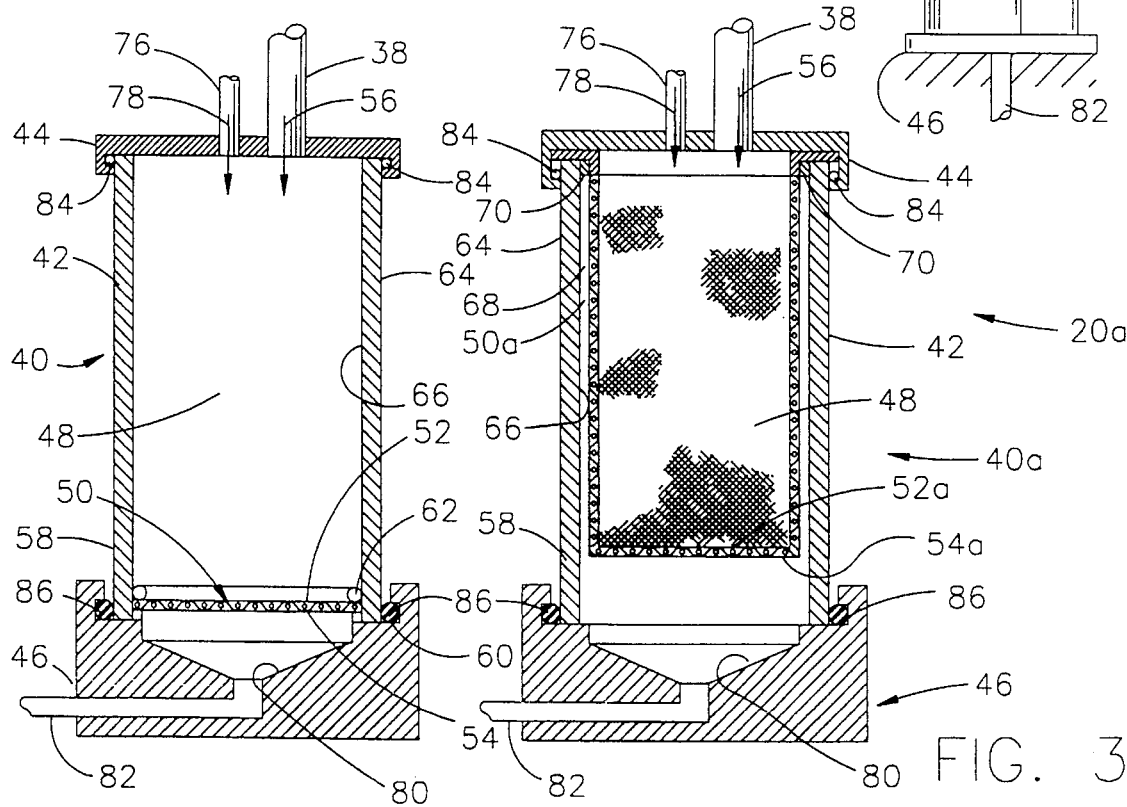
FIG. 2
FIG. 3

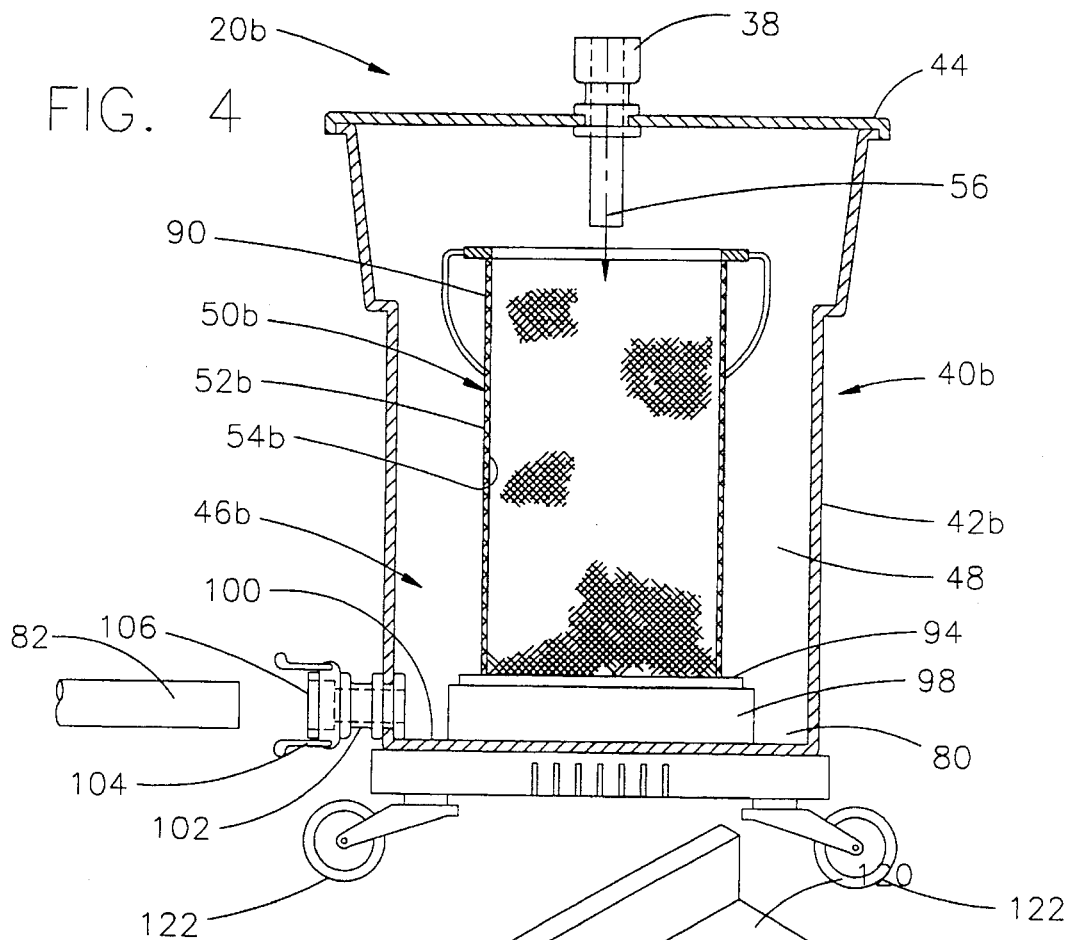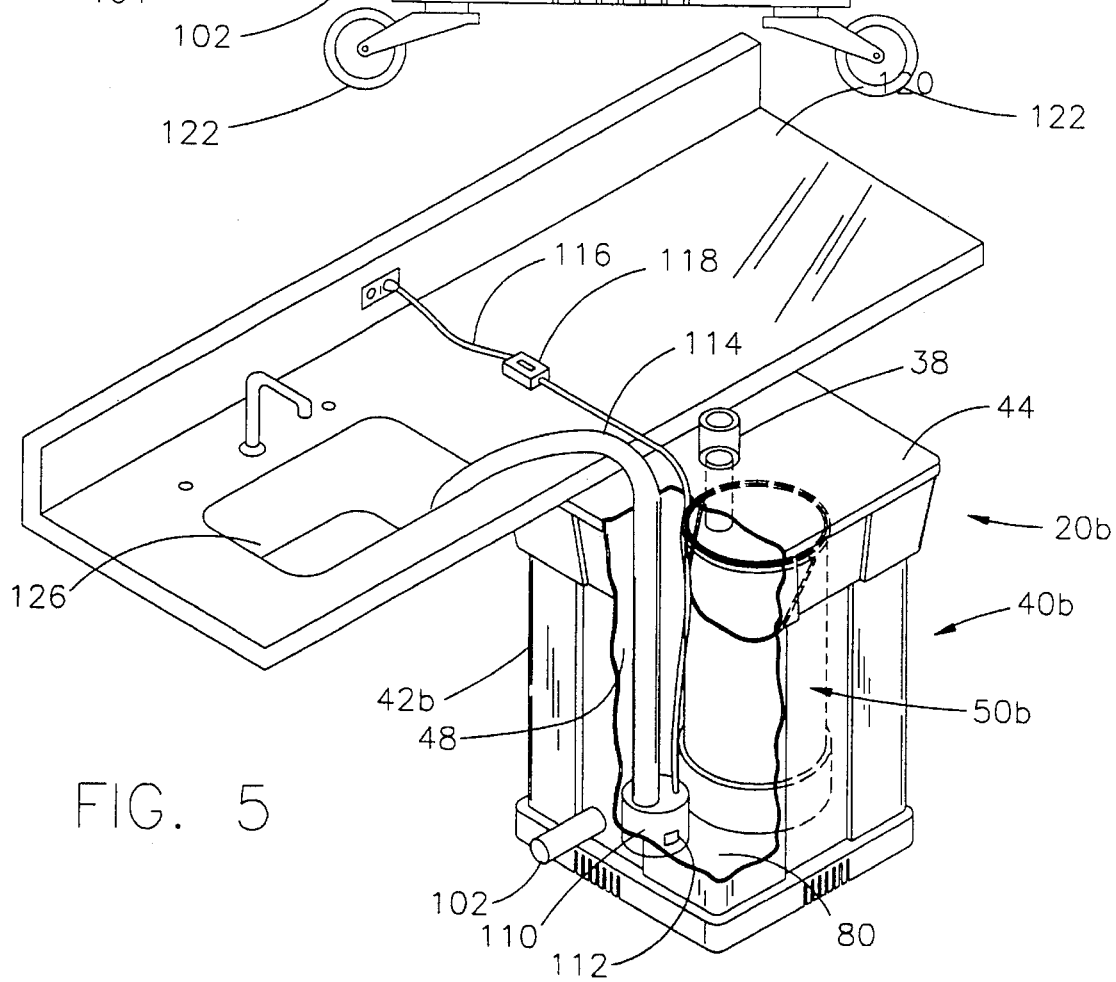

GROUNDS DISPOSAL DEVICE

BACKGROUND

The present invention relates to devices for draining and disposing of spent beverage brewing substances.

Beverage brewing devices are commonly used in high volume applications such as restaurants, catering organizations and other high volume food production institutions. A typical beverage brewing apparatus has a body which positions a funnel below a heated water source. The funnel contains a beverage brewing substance which is infused with heated water dispensed into the funnel to produce a brewed beverage. A brewed beverage is drained from the funnel into a serving decanter positioned underneath the funnel.

Such a beverage brewing device requires that the beverage brewing substance be measured and deposited into the funnel for each batch of beverage produced. Additionally, this activity inherently requires the removal of spent brewing substance after it has been infused with hot water and a brewed beverage produced therefrom. The need to fill the funnel with a beverage brewing substance and remove the spent substance from the funnel is extremely labor intensive and prone to error due to mismeasurement or failure to remove the spent brewing substance from the funnel before producing another batch of brewed beverage.

Recently, beverage brewing devices have been produced which introduce a high degree of automation to the beverage brewing process. Such a device is shown in U.S. Pat. No. 5,134,985 to Bunn et al. issued Aug. 8, 1992. The device shown in Bunn et al. includes an automatic brewing substance dispenser for dispensing a predetermined amount of beverage brewing substance into a brewing chamber. The brewing process is automated including automatically controlled brewing, dispensing and chamber cleaning. After the brewing process is complete, the spent brewing substance is expelled from the brewing chamber through a drain conduit into a waste collection container.

A problem arises, however, in handling the spent brewing substance. The volume of brewing substance and waste water requires frequent periodic removal and dumping. To improve the efficiency of the brewing device, it would be desirable to accumulate the spent brewing substance from numerous brewing cycles in order to reduce the amount of manual labor and servicing time required to maintain the brewing device.

Another problem arises with the accumulation of spent brewing substance such that a large proportion of the waste product is water which is retained by the brewing substance itself during the brewing process. Additionally, it is common for brewing devices, such as the one shown in Bunn et al., to dispense waste water used to clean the brewing chamber into a common waste collection hopper. As such, a substantial quantity of water must be dealt with in dispensing of the spent brewing substance. Attendant with the accumulation of the spent brewing substance and water is the problem of the weight of the container used to collect such waste products. Not all employees servicing the beverage brewing device are capable of lifting large quantities of spent beverage brewing slurry. Therefore, it would be desirable to provide a small waste removal container which drains off the liquid portion of the waste materials and permits the accumulation of several brew cycles worth of spent brewing substance.

One possible solution to the waste material problem that may have been tried is to simply drain all the combined spent brewing substance and waste water, the slurry, down a common drain. However, this solution may not be feasible in some areas which restrict the amount of material which can be flushed down a waste sewer along with waste liquids. Further, the plumbing requirements to flush substantial quantities of solid or particulate materials may not be available or may be cost prohibitive since they are substantially greater than those for merely draining water and other liquids.

Another problem that arises with the accumulation of spent brewing substances in brewing devices is that the spent brewing substance creates a great deal of steam and moisture which, if allowed to travel into the brewing device, may create many problems. For example, when spent brewing substances are disposed in a brewing basket, the steam rises off of the substance as the substance cools in the waste collection tray. Since the trays are positioned at the bottom of the brewing devices, the steam rising off of the spent brewing substance rises through the brewing device. While the brewing chamber is designed to infuse substances with heated water, it is difficult to protect the internal components of the brewing device from the detrimental affects of the rising steam. When the brewing device includes a brewing substance dispenser the steam may have an extremely detrimental affect on the brewing substance retained in the substance dispenser. For example, if ground coffee is retained in the substance dispenser, the steam may cause the ground coffee to cake and therefore not be properly dispensed into the brewing chamber.

Waste disposal devices such as the one shown in U.S. Pat. No. 5,245,915 to Ford, issued Sep. 21, 1993 solves many of these problems. In extremely high quantity applications, it may be desirable to quickly remove the waste liquid from the spent beverage brewing slurry in order to accommodate the higher through put or volume of waste slurry. In this regard, the device as shown in Ford '915 performs extremely well when the slurry is allowed to drain by gravity through a filter material. However, in high volume applications, this device may be delay the brewing process since a full tray signal may override continued brewing until the liquid portion of the slurry is drained.

As such, it is desirable to provide a waste disposal device which can be coupled to a beverage brewing device to receive and retain large quantities of spent beverage brewing substances and waste water and to expeditiously drain the liquid portion therefrom. Further, it is desirable to provide a disposal device which can be quickly and easily emptied so as not to slow down a large volume beverage brewing process.

OBJECTS AND SUMMARY

A general object satisfied by the invention is to provide a waste disposal device which drains a liquid portion of a beverage brewing substance slurry and accumulates a drained spent beverage brewing substance for later disposal.

Another object satisfied by the invention is to provide a disposal device for use with a beverage brewing apparatus which may be quickly disengaged from the apparatus, emptied, and returned for continued brewing. Yet another object satisfied by the invention is to provide a waste disposal device for use with a beverage brewing apparatus which employs pressurized air to facilitate draining of the liquid portion of slurry.

Still another object satisfied by the invention is to provide a waste disposal device for use with a beverage brewing apparatus which drains a liquid portion of a beverage brewing substance slurry, accumulates the liquid portion and pumps the liquid portion out of device for disposal.

Briefly, and in accordance with the foregoing, the present invention envisions a spent beverage brewing substance disposal device for use with a beverage brewing apparatus. The disposal device is connected to the beverage brewing apparatus for receiving a slurry of spent beverage brewing substance and liquid. The disposal device includes a housing having a delivery port communicating with a drain conduit of the beverage brewing apparatus for receiving the slurry therethrough. A foraminous structure is retained in the housing and positioned for receiving the slurry. The foraminous structure allows a liquid portion to drain therethrough while retaining the solid or particulate matter of the slurry. A pressurizing apparatus is coupled to the housing of the disposal device so as to pressurize the interior chamber defined by the housing to expedite the separation of the liquid portion from the solid portion. Liquid which is drained from the slurry passes through the foraminous structure and into a drain. The housing is removable from the drain so as to facilitate easy emptying of the drained portion of the spent beverage brewing substance. Seals are provided between a cover of the housing and the housing and drain so as to seal the housing against increased internal pressure induced by the pressuring apparatus. A pump is also provided to drain the liquid portion from the device.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 1 is a partial fragmentary, cross-sectional, side elevational view of a beverage brewing apparatus in which a disposal device is used;

FIG. 2 is an enlarged, partial fragmentary, cross-sectional, side elevational view of a first version of the disposal device a shown in FIG. 1;

FIG. 3 is an enlarged, partial fragmentary, cross-sectional, side elevational view of a second version of the disposal device a shown in FIG. 1;

FIG. 4 is a partial fragmentary, side elevational view of a configuration of the invention employing a portable disposal container; and FIG. 5 is a partial fragmentary, perspective view of a configuration of the invention as shown in FIG. 4 further including a pump for draining the container.

DETAILED DESCRIPTION OF THE PREFERRED EMBODIMENT

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

As shown in FIG. 1, a disposal device 20 is located in close proximity to a beverage brewing apparatus 22 so that a slurry of spent beverage brewing substance produced by the beverage brewing apparatus 22 can be dispensed or expelled into the spent beverage brewing substance disposal device 20. The slurry which is dispensed into the disposal device 20 is acted upon so that a liquid portion is separated from a particulate portion.

The beverage brewing apparatus 22 has a body 24 which houses a material hopper assembly 26 for dispensing beverage brewing substance into a brewing device or brewing chamber 28. Beverage brewing substances are dispensed into the brewing chamber 28 and infused with heated water which is delivered through a water delivery line 30 which communicates with the brewing chamber 28. A dispensing line 32 communicates with the brewing chamber 28 for dispensing a brewed beverage produced in the brewing chamber 28 into a decanter 34. During a cleaning cycle, the brewing chamber 28 is cleaned and flushed of the spent beverage brewing substance. Prior to the cleaning cycle, a valve 36 on the dispense line 32 is closed so as to direct any waste water away from the decanter 34. Waste water and a slurry of waste water and spent beverage brewing substance is expelled from the brew chamber 28 through a drain conduit 38. The drain conduit communicates with a housing 40 of the disposal device 20.

The disposal device 20 includes the housing 40 which has a body portion 42 and a cover 44. The housing 40 is releasably mounted on a drain 46 as described in further detail hereinbelow. The drain conduit 38, which is attached to the brew chamber 28 communicates with the cover 44. It should be understood that the housing 40 may have other configurations consistent with the present invention and that the conduit 38 may communicate with these other configurations of the housing 40. Examples of such other configurations is shown in FIGS. 4 and 5.

With further reference to FIGS. 2 and 3, the body or walls 42 and cover 44 of the housing 40 in combination with the drain 46 define a chamber 48. A foraminous structure is shown in FIG. 2 and represented by reference numeral 50 whereas a similar foraminous structure is shown in FIG. 3 and represented by reference numeral 50a. The foraminous structures 50, 50a are formed of a suitable mesh or otherwise apertured or porous material which has openings sufficient to allow a liquid component of the slurry to pass therethrough while retaining a generally solid or particulate portion of the slurry thereon. The foraminous structures 50, 50a have a first side 52, 52a and a second side 54, 54a. A slurry (as represented by arrow 56) is expelled through the drain conduit 38 into the chamber 48. The slurry lies on the first side 52, 52a with the second side 54, 54a generally being exposed to the chamber 48 which collects the liquid component.

As shown in FIG. 2, the foraminous structure 50 is retained in a lower portion 58 of the housing 40 so as to provide an enlarged capacity to retain an accumulation of slurry within the housing 40. The foraminous structure 50 is retained between two retainers 60, 62. The lower structure 60 being fixed to the wall 42 and the upper retainer 62 being an o-ring which is removable. The removable o-ring 62 allows the foraminous structure 50 to be removed for replacement upon wear, damage or for cleaning to remove any clogged material.

The foraminous structure 50a as shown in FIG. 3 is an elongated sleeve which is retained generally along an upper portion 64 of the housing 40. The foraminous sleeve 50a provides an increased surface area while still providing a sufficient volume for an accumulation of slurry. The second side 54a is spaced away from an inside surface 66 of the wall 42 defining a gap 68 therebetween. The gap 68 is sufficiently dimensioned to allow liquid to pass therethrough to maximize the efficiency of the foraminous structure 50a. A spacer 70 is attached to the upper portion 64 of the housing 40 to allow the foraminous structure to be generally vertically oriented while maintaining the gap 68.

A pressurizing apparatus 72 of the disposal device 20 is coupled to the housing 40 to provide pressurization of the chamber 48 from the first side 52, 52a of the foraminous structure 50, 50a so as to facilitate the expeditious separation of the liquid component of the slurry from the solid or particulate component of the slurry. The beverage brewing apparatus 22 may be of a type which includes a movable piston (not shown) positioned in the brewing chamber 28. The movable piston is employed to seal the access to the drain conduit 38 thereby preventing back pressure through the drain conduit 38 when the disposal device 20 is pressurized. Alternatively, a controllable valve 73 may be attached to the drain conduit 38 to close the drain conduit 38 while pressurizing the disposal device 20. The controllable valve 73 may either be controlled by the controller 90 or may be manually controllable.

The pressurizing apparatus 72 includes a pressure generator 74 and an air line 76 connected between the pressure generator or air pump 74 and the housing 40. While the pump 74 is shown housed in the beverage brewing apparatus 22 in FIG. 1, other locations for the pump 74 are considered to be within the scope of this invention. In other words, the present invention should not be restricted by the location of the pump 74. The pump 74 forces air through the air line 76 (as shown by arrow 78 in FIGS. 2 and 3) into the chamber 48 whereupon it acts on the slurry retained on the first side 52, 52a of the foraminous structure 50, 50a.

Liquid which is forced from the first side 52, 52a of the foraminous structure 50, 50a through to the second side 54, 54a drains into a collection basin 80 of the drain structure 46. The drain structure 46 includes a drain pipe 82 which drains to a disposal drain or sewer.

A cover seal 84 is provided in each of the versions shown in FIGS. 2 and 3 between the cover 44 and the body 42. A drain seal 86 is provided in each of the embodiments between the drain structure 46 and the lower portion 58 of the body 42. The seals 84, 86 seal the housing 40 against increased pressure in the chamber 48 created by the pressuring apparatus 72. As such, a positive pressure is asserted against the slurry retained on the first side 52, 52a of the foraminous structure 50, 50a to force the fluid component through the foraminous structure 50, 50a. The seals 84, 86 help maintain the positive increased pressure within the chamber 48.

Another configuration of the disposal device 20b is shown in FIGS. 4 and 5. The disposal device 20b includes the housing 40b which has a body portion 42b and a cover 44b. The walls 42b and cover 44b of the housing 40b define a chamber 48. The drain conduit 38, which is attached to the brew chamber 28 of the brewing apparatus 22 as shown in FIG. 1, communicates with the cover 44b.

A foraminous structure is shown in FIGS. 4 and 5 represented by reference numeral 50b. The foraminous structure 50b is formed of a suitable mesh or otherwise apertured or porous material which has openings sufficient to allow a liquid component of the slurry to pass therethrough while retaining a generally solid or particulate portion of the slurry therein. As shown in FIGS. 4 and 5, the foraminous structure 50b is in the form of a grounds strainer basket having foraminous side walls 90 and a generally rigid base 94. A handle structure 96 is provided for removal of the drained component of the slurry at an appropriate time. The side walls 90 have a first side 52b and a second side 54b. When the slurry (as represented by arrow 56) is expelled through the drain conduit 38 into the chamber 48, the slurry lies on the first side 52b with the second side 54b generally being exposed to the chamber which collects the liquid component. A liquid component drains into a drain area 80. The foraminous strainer basket structure 50b is generally an elongated cylindrical structure which is positioned on an upstanding base elevating the basket 50b above the bottom 100 of the housing 40b. An increased surface area is provided by the foraminous side walls 90 of the basket while providing a sufficient volume for an accumulation of slurry therein.

When a liquid component of the slurry drains from the basket 50b, it drains downwardly towards the bottom 100 to collect in the drain area 80. A drain coupling 102 is attached and extends through the body portion 42b of the housing 40b. A valve or cover 104 is provided on the drain coupling to allow control of the flow from the drain area 80. The valve 104 is provided with a coupling end 106 to allow the drain coupling 102 to be attached to the drain line 82 which drains to a disposal drain or sewer.

The embodiment as shown in FIG. 5 is essentially the embodiment as shown in FIG. 4 with the addition of a pump apparatus 110 which is positioned in the drain area 80. The pump apparatus includes a level sensor 112 which senses the level of the liquid accumulating in the drain area 80 of the chamber 48, a pump tube 114, and a power line 116. The pump apparatus 110 is used to pump water from the drain area out of the housing 40b through the pump tube 114 and into an appropriate drain. The power line 116 is used to provide power to the pump 110. The pump 110 can be operated by way of a switch 118 coupled to the power 116. The level sensor 112 can also be used to operate the pump such that when the power is activated in the power line 116, the level sensor will activate the pump when the level in the drain area 80 reaches a predetermined level. The embodiment as shown in FIG. 5 is shown including the drain coupling 102 for providing greater flexibility in choosing how to drain the housing 40b. Alternatively, the drain coupling 102 may be omitted from the housing 40b.

The embodiments as shown in FIGS. 4 and 5 are particularly useful where mobility and portability of the disposal device 20b is important. For example, the embodiments as shown in FIGS. 4 and 5 can be positioned underneath a countertop 120 and coupled to a brewing apparatus by way of the drain conduit 38. It should be understood that the drain conduit may merely extend through a hole in the cover or may provide a coupling to specifically couple the drain conduit 38 to the cover. Regardless of the method of coupling the drain conduit 38 to the disposal device, the drain conduit is positioned for disposing a slurry 56 into the device. If the layout of the particular location allows, a permanent drain line 82 can be provided for the disposal device. The mobile base structure having wheels 122 allows the device to be moved from underneath the countertop when the drained component of the slurry must be removed from the basket. In using the device as shown in FIG. 4, the disposal device 20b is positioned proximate to the brewer 22 and connected to the drain conduit 38 extending therefrom. The drain coupling 102 is connected to the drain 82. As slurry is dispensed into the basket 50b, the liquid component drains out into the drain area 80 and flows through the drain coupling 102. When the valve 104 is open, the fluid is allowed to drain to the drain pipe 82. When a sufficient amount of drain beverage brewing substance has accumulated in the basket 50b, the disposal device can be disconnected from the drain pipe 82 and the drain conduit 38 and then removed from its stored position underneath the countertop.

The embodiment as shown in FIG. 5 can be used in much the same manner as the embodiment as shown in FIG. 4 described hereinabove. The additional advantage of the embodiment as shown in FIG. 5 is that, depending upon the layout of the particular location, a specialized drain line does not need to be provided for connection to the drain coupling 102. In otherwords, the disposal device 20b can be positioned proximate to a beverage brewer 22 and connected to an appropriate drain conduit 38. The connection to the drain conduit need not be directly below the beverage brewing device 22 but may be positioned away therefrom allowing a flexible connection of the drain conduit 38. When a sufficient quantity of brewing substance has drained and collected in the basket 50b, the device 20b can be disconnected from the drain conduit and positioned near a sink 126. The pump tube 114 is positioned in the sink and the power line 116 is connected to an appropriate outlet. Once the pump 110 is activated, the drain component of the slurry can be suctioned from the drain area 80 and dispensed into the sink 126. The level sensor 112 may be useful when the draining the liquid component while the slurry is still draining in the basket 50b.

Further, the embodiments as shown in FIGS. 4 and 5 may also include the pressurizing apparatus 72 as shown in FIGS. 1–3. This embodiment, a seal is added between the cover and the housing 44b,40b to maintain the pressure therein. Additionally, the valve 104 becomes more instrumental in that the valve is shut while the pressurizing apparatus 72 pressurizes the chamber to prevent loss of pressure.

Still a further use for the present invention is to accumulate moist waste including the beverage brewing substance described herein and any other moist waste associated with the beverage preparation or any other food preparation. In this regard, any of the embodiments as shown in FIGS. 2–5 may be positioned in close proximity to a preparation area. The drain conduit 38 provides axis to the housing such that moist waste can be deposited through the drain conduit 38 into the housing. The moist waste drains with the liquid component collecting in a drain area 80. While the above description generally employs examples using a beverage brewing apparatus 22, other moist wastes are often produced in a food preparation setting. For example, in the coffee brewing industry, it is common for an espresso bar to have a spent ground collection bin. When espresso has been drawn from the coffee powder, the spent moist grounds are deposited into the collection bin. While most of the water has been drained from the espresso powder as a result of the pressurization of the espresso process, such grounds still contain liquid which will drain out given sufficient time. As such, the present invention is also useful for the collection of various moist waste and the draining of a liquid component therefrom so that only the solid, or particulate component of the moist waste is disposed of. This also eliminates the need for operating a garbage disposal in a sink and the attendant time and energy costs as well as maintenance costs associated with such a disposal. The capacity of the present invention can be increased or decreased depending on the specific application and as such, the capacity should not be a limiting factor in the interpretation of the present invention.

In use, the disposal device 20 of the present invention is connected to a beverage brewing apparatus 22 by way of the drain conduit 38. The drain conduit 38 delivers a slurry of spent beverage brewing substance and liquid to the chamber 48 and deposits the slurry onto the first side 52, 52a of the foraminous structure 50, 50a. The pressurizing apparatus 72 creates a positive pressure by forcing air through air line 76 into the chamber 48 thereby expediting separation of the liquid component of the slurry. A controller 90 of the brewing apparatus 22 controls cycles of the brewing apparatus 22 to synchronize dispensing of brewing substance from the material hopper 26 assembly into the brewing device 28, the dispensing of water through the water delivery line 30 into the brewing device 28, dispensing of a brewed beverage from the brewing device 28, and expelling of spent brewing substance from the brewing device. The controller is also coupled to the pressurizing apparatus 72 for controllably operating the pressurizing apparatus 72 in synchronization with the other components of the brewing apparatus 22 for draining slurry of its liquid component.

Once a sufficient quantity of drained spent beverage brewing substance has built up inside of the housing, the cover 44 is removed and the body 42 (see FIG. 2) is disengaged from the drain structure 46. The drained slurry component can then be emptied from the body 42 into an appropriate waste receptacle. The foraminous structure 50a as shown in FIG. 3 is designed to be removable such that only the foraminous structure 50a is removed from the body 42 and emptied. After emptying the body 42 the cover 44 is reattached to the body 42 thereby readying the disposal device 20 for further use.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A spent beverage brewing substance disposal device for use with a beverage brewing apparatus, said beverage brewing apparatus having a brewing device for producing a brewed beverage from a beverage brewing substance, a drain conduit in communication with said brewing device for removing a slurry of moist beverage brewing substance from said beverage brewing device, said disposal device comprising:

a housing having a delivery port communicating with said drain conduit for receiving said slurry therethrough;

a foraminous structure having a first side and a second side, said foraminous structure being retained in said housing and positioned for receiving said slurry from said delivery port on said first side;

a drain positioned in relation to said second side of said foraminous structure for collecting and draining liquid passing through said foraminous structure; and pressurizing apparatus operatively connected to said housing for increasing the air pressure in said housing for promoting separation of liquid from said slurry disposed on said first side of said foraminous structure, said liquid draining from said foraminous structure and collecting in said drain.

2. A spent beverage brewing substance disposal device as recited in claim 1, said housing including a cover for sealing said housing against increased internal pressure, said pressurizing apparatus further comprising a pressure generator coupled to said housing and communicating with the internal volume of said housing for pressurizing the volume of said housing to facilitate the separation of liquid from said slurry disposed therein.

3. A spent beverage brewing substance disposal device as recited in claim 1, wherein said foraminous structure is a filter retained in a lower portion of said housing, said filter being constructed to allow liquids to pass therethrough.

4. A spent beverage brewing substance disposal device as recited in claim 1, wherein said foraminous structure is a filter sleeve retained generally along a top portion of said housing and extending through said housing towards a bottom portion of said housing, said filter sleeve defining walls generally spaced away from corresponding inside surfaces of said housing, said filter sleeve being constructed to allow liquids to pass therethrough.

5. A spent beverage brewing substance disposal device as recited in claim 4, wherein said filter sleeve is a generally rigid structure which is removable from said housing for emptying of drained spent beverage brewing substance.

6. A spent beverage brewing substance disposal device as recited in claim 1, wherein said housing including said foraminous structure is removable from said drain for emptying of drained spent beverage brewing substance.

7. A spent beverage brewing substance disposal device as recited in claim 6, further including a seal positioned between said drain and a corresponding outside surface of said housing.

8. A spent beverage brewing substance disposal device for use with a beverage brewing apparatus, said beverage brewing apparatus having a brewing device for producing a brewed beverage from a beverage brewing substance, a drain conduit in communication with said brewing device for removing a slurry of moist beverage brewing substance from said brewing device, said disposal device comprising:

a housing having walls and a removable cover, said cover being sealable against increased internal pressure, a delivery port in said housing communicating with said drain conduit for receiving said slurry therethrough;

a foraminous structure having a first side and a second side, said foraminous structure being retained in said housing and positioned for receiving said slurry from said delivery port on said first side;

a drain positioned in relation to said second side of said foraminous structure for collecting and draining liquid passing through said foraminous structure, a seal positioned between said drain and a corresponding outside surface of said housing sealing said drain and housing against increased internal pressure; and a pressurizing apparatus operatively connected to said housing for increasing the air pressure in said housing for promoting separation of liquid from said slurry disposed on said first side of said foraminous structure, said liquid draining from said foraminous structure and collecting in said drain.

9. In combination with a beverage brewing apparatus of the type having an assembly for producing a brewed beverage from a beverage brewing substance, a drain conduit in communication with said beverage brewing assembly for removing a slurry of moist beverage brewing substance from said beverage brewing assembly, a spent beverage brewing substance disposal device comprising:

a housing having walls and a removable cover, said cover being sealable against increased internal pressure, a delivery port in said housing communicating with said drain conduit for receiving said slurry therethrough;

a foraminous structure having a first side and a second side, said foraminous structure being retained in said housing and positioned for receiving said slurry from said delivery port on said first side;

a drain positioned relative to said second side of said foraminous structure for collecting and draining liquid passing through said foraminous structure, a seal positioned between said drain and a corresponding outside surface of said housing sealing said drain and housing against increased internal pressure; and a pressurizing apparatus operatively connected to said housing for increasing the air pressure in said housing for promoting separation of liquid from said slurry disposed on said first side of said foraminous structure, said liquid draining from said foraminous structure and collecting in said drain.

10. A spent beverage brewing substance disposal device as recited in claim 9, said brewing apparatus including a control device which controls cycles of the brewing apparatus, said control device being coupled to said pressurizing apparatus for controllably operating said pressurizing apparatus for draining slurry.

11. A spent beverage brewing substance disposal device as recited in claim 10, wherein said foraminous structure is a generally cylindrical filter sleeve retained in said chamber of said housing, said filter sleeve defining walls generally spaced away from corresponding inside surfaces of said housing, said filter sleeve being constructed to allow liquids to pass therethrough.

12. A spent beverage brewing substance disposal device as recited in claim 10, said drain means further comprising a pump positioned in said drain area for controllably moving a liquid from said drain area and out of said housing.

13. A spent beverage brewing substance disposal device as recited in claim 10, said drain means comprising a drain coupling with a controllable valve which is connectable to a drain line for draining a liquid from said drain area.

14. A spent beverage brewing substance disposal device for use in draining a liquid portion from a slurry of moist beverage brewing substance, a conduit for receiving a slurry of moist beverage brewing substance therethrough, said disposal device comprising:

a housing defining a chamber communicating with said conduit for receiving said slurry therethrough;

an elevated base positioned in a lower portion of said housing;

a foraminous structure having a first side and a second side, said foraminous structure being on said elevated base in said housing and positioned for receiving said slurry from said conduit on said first side, said foraminous structure defining a generally rigid filter sleeve structure which is removable from said housing for emptying of drained spent beverage brewing substance;

a drain area positioned in relation to said second side of said foraminous structure and around said elevated base for collecting and draining liquid passing through said foraminous structure;

drain means positioned in said drain area for controllably draining a liquid from said drain area; and a pump coupled to said housing for increasing the internal pressure in said housing, said pump having a level sensor for sensing the level of a liquid accumulating in said drain area, said level sensor automatically activating said pump when said liquid rises above a predetermined level.

* * * * *